Figure 1:
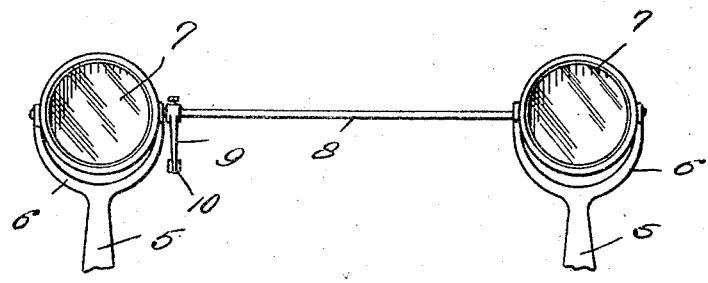

Aug. 18, 1925.

E. S. CARLETON 1,550,204

VEHICLE HEADLIGHT

Filed March 31, 1924

E. S. Carleton,
Inventor

By Clarence A. O'Brien
Attorney

Patented Aug. 18, 1925.

1,550,204

UNITED STATES PATENT OFFICE.

ELWIN S. CARLETON, OF NEW YORK, N. Y.

VEHICLE HEADLIGHT.

Application filed March 31, 1924. Serial No. 703,236.

*To all whom it may concern:*

Be it known that I, ELWIN S. CARLETON, a citizen of the United States, residing at New York, in the county of New York and State of New York, have invented certain new and useful Improvements in Vehicle Headlights, of which the following is a specification.

This invention relates to headlights for vehicles, and the primary object of the invention is to provide means whereby said headlights may be tilted downwardly for directing the light rays therefrom, in a downward path, while approaching an oncoming vehicle for obviously preventing the blinding of the driver of said oncoming vehicle.

An additional object of the invention is to provide hood members for ready attachment to the headlights for normally directing the light rays in a straight path and for preventing the wide spread of the light rays at points adjacent the headlights which is an unnecessary occurrence, in all headlights with which I am familiar, it being obvious that these hoods for effecting the true forward projections of the light rays, will substantially increase the light ray projections in a forward direction, for allowing the driver of the vehicle to see a distance considerably beyond the vehicle.

An additional object is to provide means for permitting of the ready tilting movement of the headlight at a point adjacent the driver's seat of the vehicle.

With the foregoing and other objects in view, as the nature of the invention will be better understood, the same comprises the novel form, combination, and arrangement of parts hereinafter more fully described, shown in the accompanying drawing and claimed.

Figure 2:
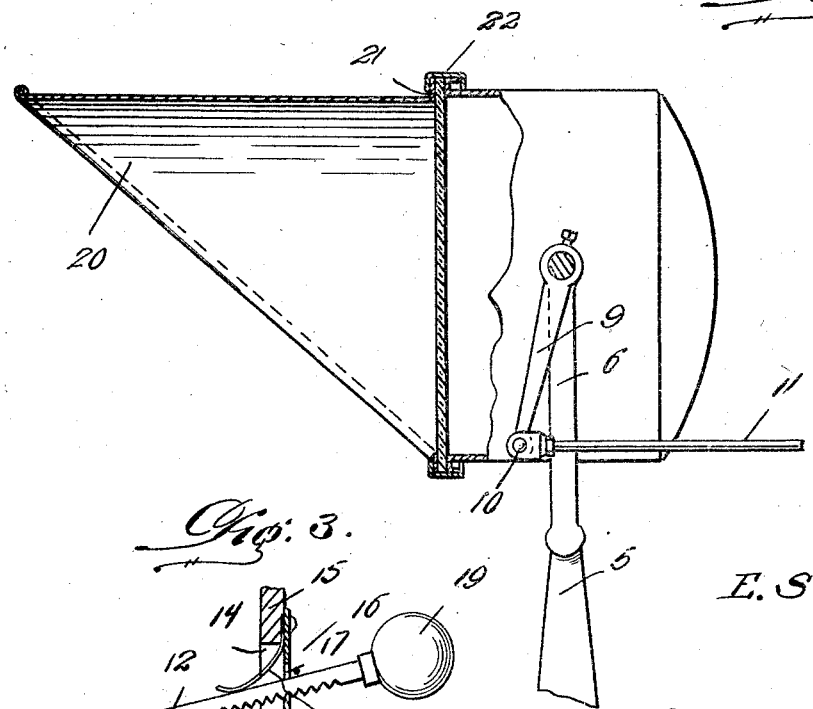
Figure 3:
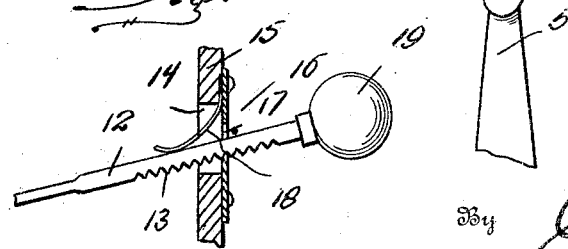

In the drawing, wherein like reference characters indicate corresponding parts throughout the several views:

Figure 1 is a front elevational view of a pair of headlights constructed in accordance with the present invention, Figure 2 is a view partly in side elevation, and partly in cross section, of one of the head lights of the present invention, said view also disclosing in side elevation, a means whereby said headlight may be tilted, and Figure 3 is a fragmentary sectional view, through the instrument board of the vehicle, which is equipped with an opening, through which extends one end of the headlight operating rod, whereby said headlight may be tilted to the desired angle with respect to the longitudinal axis of the vehicle body.

Now having particular reference to the drawing, 5—5 indicates a well known form of headlight supporting posts, the upper ends of which are forked as at 6—6.

In the present instance, the headlights 7—7 are disposed for tilting movement within the forward ends of said posts, in any manner desirable, and said headlights 7—7 are interconnected through the medium of a horizontal rod 8. Rigidly attached to this rod 8, at a desirable point thereon, is an arm 9, that is adapted to be pivotally secured at its lower end as at 10, to one end of a rearwardly extending rod 11. This rod 11 terminates at its opposite end in a flat portion 12, the lower end of which is notched as at 13, this end of the rod passing through an opening 14, in the instrument board 15 of the vehicle, equipped with the headlights 7—7. Upon the inner side of said instrument board 15, at the point of the opening 14, is a metallic plate 16, that is formed with a slot 17, through which passes said flat portion 12 of the rod 13, the lower edge of this opening adapted to engage between different of the teeth 13 of said rods, for obviously maintaining this rod in adjusted position. The toothed end of this rod is maintained in engagement with the lower edge of the plate opening 17, through the medium of a spring 18, that is connected at one end to the plate, and bears at its other end against the upper untoothed edge of the flat portion 12 of said rod 11.

The extreme free end of this rod is equipped with a ball head 19, for facilitating the operation of the rod, and it will be apparent that as the rod 11 is pulled rearwardly, the headlights 7—7 will be tilted in a downward direction for obviously directing the rays from these headlights in a downward path.

Each of said headlights 7—7 is equipped with a peak shaped hood 20, that is formed with a flange 21, at its inner end, for allowing the same to be attached to the headlights, through the medium of the usual lens retaining rim 22.

The lower edges of the side walls of these hoods are inclined in a direction toward their forward ends as clearly shown in Figure 2, it being apparent that the light rays from the headlight will be confined to an area equivalent to the transverse area of the headlight, which will give a greater projection of the light rays and for preventing the light rays from flaring in an outward and upward direction, which is unnecessary.

It will thus be seen that I have provided a highly novel and useful form of headlight construction for vehicles, and one that will meet with all of the requirements for a successful commercial use.

Minor changes may be made in the invention, without departing from the spirit and scope of the appended claim.

Having thus described my invention, what I claim as new and desire to secure by Letters Patent, is:

In combination, a dirigible headlight, a rod for operating the dirigible headlight and terminating in a flat end having its under edge provided with a plurality of notches, a board having an opening, a plate provided with an opening registering with and smaller than the opening in the board, the flat end of said rod extending through said openings so that the notches engage with the bottom edge of the opening in the plate, a leaf spring having one end disposed between the board and the plate and extending therefrom in a curved portion engaging the upper edge of the flat end for holding the notches engaged with the bottom edge of the opening in the plate, and a fastening element piercing the plate, the spring, and the board.

In testimony whereof I affix my signature.

ELWIN S. CARLETON.